United States Patent
Kim et al.

(10) Patent No.: US 9,145,934 B2
(45) Date of Patent: Sep. 29, 2015

(54) DECELERATOR AND MOTOR BRAKE WITH THE SAME

(71) Applicant: Mando Corporation, Pyeongtaek-si, Gyeonggi-do (KR)

(72) Inventors: Jin Seok Kim, Suwon-si (KR); Chang Bok Ko, Namyangju-si (KR)

(73) Assignee: MANDO CORPORATION, Pyeongtaek-Si, Gyeonggi-Do (KR)

( * ) Notice: Subject to any disclaimer, the term of this patent is extended or adjusted under 35 U.S.C. 154(b) by 326 days.

(21) Appl. No.: 13/667,948

(22) Filed: Nov. 2, 2012

(65) Prior Publication Data

US 2013/0105253 A1      May 2, 2013

(30) Foreign Application Priority Data

Nov. 2, 2011   (KR) .................. 10-2011-0113251

(51) Int. Cl.
| | |
|---|---|
| *F16D 55/08* | (2006.01) |
| *F16D 55/226* | (2006.01) |
| *B60T 13/74* | (2006.01) |
| *F16H 1/46* | (2006.01) |
| *F16H 1/32* | (2006.01) |
| *F16D 121/24* | (2012.01) |
| *F16D 125/50* | (2012.01) |

(52) U.S. Cl.
CPC ............. *F16D 55/226* (2013.01); *B60T 13/741* (2013.01); *F16H 1/46* (2013.01); *F16D 2121/24* (2013.01); *F16D 2125/50* (2013.01); *F16H 2001/325* (2013.01)

(58) Field of Classification Search
CPC .... B60W 10/08; B60W 10/115; B60K 6/445; B60K 6/365; B60K 17/046; B60T 13/746; H02K 51/00
USPC .............. 188/2 D, 72.1, 72.2, 72.8; 180/65.1, 180/65.51, 65.6; 475/149, 150, 162–181
See application file for complete search history.

(56) References Cited

U.S. PATENT DOCUMENTS

| 8,827,052 B2* | 9/2014 | Yu et al. ........................ 188/72.1 |
| 8,851,242 B2* | 10/2014 | Kim ............................. 188/72.1 |
| 2002/0111243 A1* | 8/2002 | Minegishi et al. ............. 475/178 |
| 2007/0151816 A1* | 7/2007 | Gil et al. ....................... 188/2 D |
| 2009/0294224 A1* | 12/2009 | Sakashita ..................... 188/72.2 |

FOREIGN PATENT DOCUMENTS

| JP | 2010-038307 A | 2/2010 |
| KR | 10-2010-0097564 A | 9/2010 |
| KR | 10-1041553 B1 | 6/2011 |

OTHER PUBLICATIONS

Korean Office Action, w/ English translation thereof, issued in Korean Patent Application No. KR 10-2011-0113251 dated Feb. 21, 2013.

* cited by examiner

*Primary Examiner* — Vishal Sahni
(74) *Attorney, Agent, or Firm* — McDermott Will & Emery LLP

(57) ABSTRACT

Disclosed are a decelerator configured so that a planet gear type first deceleration unit is provided inside a cycloid type second deceleration unit to provide eccentric rotational force to the second deceleration unit and a motor brake with the same. In the decelerator, the increase in axial thickness of a motor is restrained, and a deceleration ratio is effectively increased. In the motor brake with the decelerator, the deceleration ratio of the motor is increased, and the increase in total length of the motor brake is restrained by the decelerator, thereby improving space utilization.

3 Claims, 4 Drawing Sheets

DECELERATOR AND MOTOR BRAKE WITH THE SAME

CROSS-REFERENCE TO RELATED APPLICATION

This application claims the benefit of Korean Patent Application No. 2011-0113251, filed on Nov. 2, 2011 in the Korean Intellectual Property Office, the disclosure of which is incorporated herein by reference.

BACKGROUND

1. Field

Embodiments of the present invention relate to a decelerator configured so that the increase in axial thickness of a motor is restrained, and a deceleration ratio is effectively increased, and a motor brake with the same.

2. Description of the Related Art

In recent years, brakes used in vehicles have increasingly adopted a motor as a power source. A representative example of the brakes is a disc type motor brake adopting a motor as a power source of a driving device to press a frictional pad/

The disc type motor brake includes a disc rotated together with a wheel of a vehicle, a pair of frictional pads to press the disc, a carrier to support the frictional pads, a piston to push one of the frictional pads to the disc, a caliper housing supported at the carrier in an advance and retreat fashion, the caliper housing has a cylinder to receive the piston, a motor to generate rotational force in alternating directions, and a conversion unit to convert rotation of the motor into linear reciprocation and to transmit the linear reciprocation to the piston. A screw shaft coupled to the piston is generally used as the conversion unit.

In the motor brake with the above-stated construction, driving force from the motor is transmitted to the screw shaft constituting the conversion unit, and the piston is linearly reciprocated in the rotation direction of the screw shaft in a state in which rotation of the piston is restricted to push the frictional pads to the disc, thereby performing a braking operation.

Generally, RPM of a motor is high, whereas torque of the motor is low. For this reason, a decelerator is generally used to increase the torque. In the motor brake, a decelerator to increase torque of the motor is connected between the motor and the conversion unit.

The decelerator generally includes a plurality of planet gear units stacked in the axial direction of the motor to increase a deceleration ratio, thereby achieving deceleration in multi stages.

However, the planet gear units stacked in the axial direction of the motor excessively increase the total length of the brake in the axial direction of the motor, thereby lowering space utilization of a vehicle.

SUMMARY

Therefore, it is an aspect of the present invention to provide a decelerator configured so that the increase in axial thickness of a motor is restrained, and a deceleration ratio is effectively increased, and a motor brake with the same.

Additional aspects of the invention will be set forth in part in the description which follows and, in part, will be obvious from the description, or may be learned by practice of the invention.

In accordance with one aspect of the present invention, a decelerator includes a first deceleration unit including a sun gear provided to rotate coaxially with an input shaft, a plurality of planet gears provided around the sun gear so as to revolve around the sun gear while rotating on their axes during rotation of the sun gear, and a ring gear fixed in a state in which the ring gear is circumscribed about the planet gears to guide revolution of the planet gears, a carrier mounted around the first deceleration unit so as to be eccentrically rotated according to the revolution of the planet gears, and a second deceleration unit including an inner gear disposed around the carrier so as to be eccentrically rotated together with the carrier, the inner gear having cycloid teeth formed at an outer circumference thereof and a plurality of through holes provided between an inner circumference and the outer circumference thereof in a circumferential direction, an outer gear provided outside the inner gear so that the outer gear is provided at an inner circumference thereof with teeth corresponding to the cycloid teeth, and an output member provided around a center of one side thereof with a plurality of protrusions arranged in a circumferential direction so as to be inserted into the through holes, each of the protrusions having a less diameter than each of the through holes, and provided at a center of the other side thereof with an output shaft.

The carrier may include a ring provided to surround an outer circumference of the ring gear and a plate to close one end of the ring, the carrier being formed in a cup shape receiving the first deceleration unit therein, an inner circumferential center of the ring may be eccentric with respect to an outer circumferential center of the ring, and shafts of the planet gears may be fixed to the plate.

The decelerator may further include a bearing provided between an outer circumference of a ring of the carrier and the inner circumference of the inner gear so that the carrier slips with respect to the inner circumference of the inner gear.

In accordance with another aspect of the present invention, a motor brake includes a disc rotated together with a wheel of a vehicle, a frictional pad to press the disc, a piston to push the frictional pad to the disc, a motor to generate rotational force in alternating directions, a conversion unit to convert rotation of the motor into linear reciprocation and to transmit the linear reciprocation to the piston, and a decelerator provided between the motor and the conversion unit to decelerate the motor, wherein the decelerator includes a first deceleration unit including a sun gear provided to rotate coaxially with an input shaft rotated together with a shaft of the motor, a plurality of planet gears provided around the sun gear so as to revolve around the sun gear while rotating on their axes during rotation of the sun gear, and a ring gear fixed in a state in which the ring gear is circumscribed about the planet gears to guide revolution of the planet gears, a carrier mounted around the first deceleration unit so as to be eccentrically rotated according to the revolution of the planet gears, and second deceleration unit including an inner gear disposed around the carrier so as to be eccentrically rotated together with the carrier, the inner gear having cycloid teeth formed at an outer circumference thereof and a plurality of through holes provided between an inner circumference and the outer circumference thereof in a circumferential direction, an outer gear provided outside the inner gear so that the outer gear is provided at an inner circumference thereof with teeth corresponding to the cycloid teeth, and an output member provided around a center of one side thereof with a plurality of protrusions arranged in a circumferential direction so as to be inserted into the through holes, each of the protrusions having a less diameter than each of the through holes, and provided at a center of the other side thereof with an output shaft.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Figure 1:
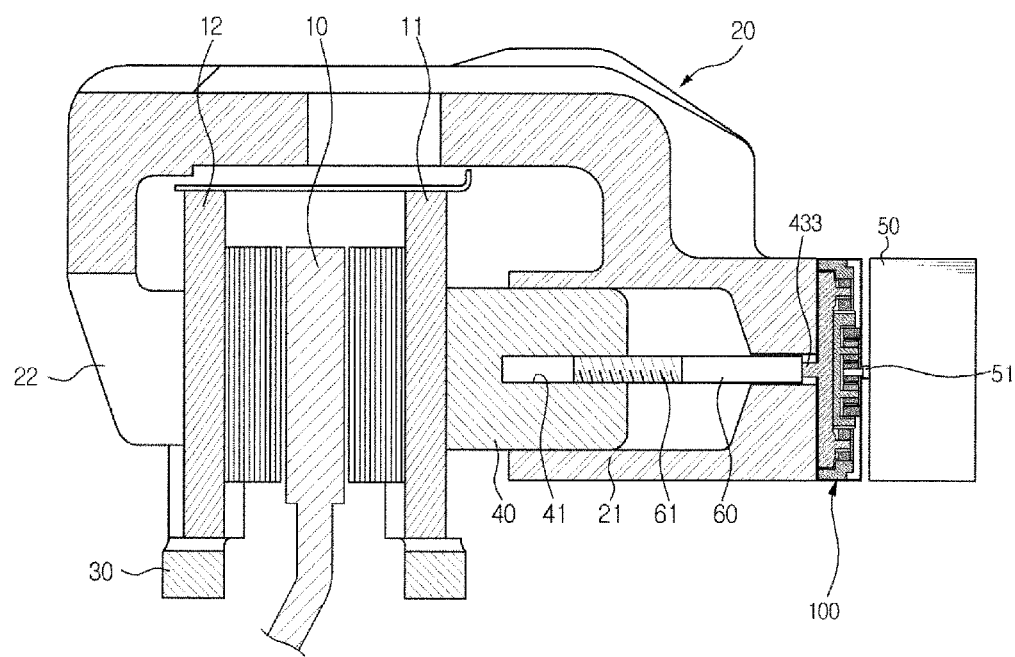
FIG. 1 is a sectional view showing the structure of a motor brake according to an embodiment of the present invention.

Reference will now be made in detail to the embodiments of the present invention, examples of which are illustrated in the accompanying drawings, wherein like reference numerals refer to like elements throughout.

As shown in FIG. 1, a motor brake according to an embodiment of the present invention is a disc type braking device that presses a portion of a disc 10 rotated together with a wheel (not shown) using a pair of frictional pads 11 and 12 to generate braking force. The motor brake includes a carrier 30 fixedly mounted to a knuckle of a car body and a caliper housing 20 slidably coupled to the carrier 30.

The caliper housing 20 is provided at one side thereof with a cylinder 21. A piston 40 to push the frictional pad 11 to the disc 10 is mounted at the cylinder 21. The caliper housing 20 is provided at the other side thereof with a finger 22 bent downward. The finger 22 is integrally connected to the cylinder 21 to push the frictional pad 12 to the disc 10 according to sliding movement of the caliper housing 20. The frictional pads 11 and 12 may include a first frictional pad 11 adjacent to the piston 40 and a second frictional pad 12 opposite thereto.

The carrier 30 is provided under the caliper housing 20 to guide vertical movement of the frictional pads 11 and 12 while preventing separation of the frictional pads 11 and 12.

During a braking operation, the piston 40 is linearly reciprocated according to driving of an electromotive motor 50 fixedly mounted at the rear of the piston 40 to push the first frictional pad 11 to the disc 10. Driving force of the motor 50 is amplified by a decelerator 100 and is transmitted to the piston 40 via a conversion unit 60 constituted by a screw shaft.

One end of the conversion unit 60 is coupled to the piston 40 in a screw fastening fashion along the same axis as the movement direction of the frictional pads 11 and 12, and the other end of the conversion unit 60 extends in the backward direction of the piston 40 and is connected to an output shaft 433 of the decelerator 100.

The piston 40 is mounted in the cylinder 21 so as to advance and retreat in a state in which rotation of the piston 40 is restricted. The piston 40 has a female screw 41 coupled to the conversion unit 60. To restrict rotation of the piston 40, the piston 40 may be provided at the outer circumference thereof with a key extending in the longitudinal direction, and the cylinder 21 may be provided at the inner wall thereof with a key groove, in which the key of the piston 40 is slidably fitted. In addition, the rotation of the piston 40 may be restricted by various other structures, such as a structure in which the outer circumference of the piston and the inner wall of the cylinder 21 corresponding thereto are configured in a polygonal shape.

The conversion unit 60 is provided at one side thereof with a male screw 61 coupled to the female screw 41 of the piston 40. The conversion unit 60 is rotatably mounted in the cylinder 21 in parallel to the advance and retreat direction of the piston 40.

The motor 50 is disposed outside the cylinder 21 in the backward direction of the piston 40, and the decelerator 100 is disposed between the cylinder 21 and the motor 50.

Driving force of the motor 50 is transmitted to the screw shaft constituting the conversion unit 60, and therefore, the piston 40 is linearly reciprocated in the rotating direction of the screw shaft in a state in which the rotation of the piston 40 is restricted to push the frictional pads 11 and 12 to the disc 10. In this way, the motor brake performs a braking operation.

Meanwhile, the decelerator 100 is provided to restrain lengthening of the total length of the motor brake while so effectively increasing a deceleration ratio to increase driving force of the motor 50. Hereinafter, the structure of the decelerator 100 will be described in detail.

Figure 2:
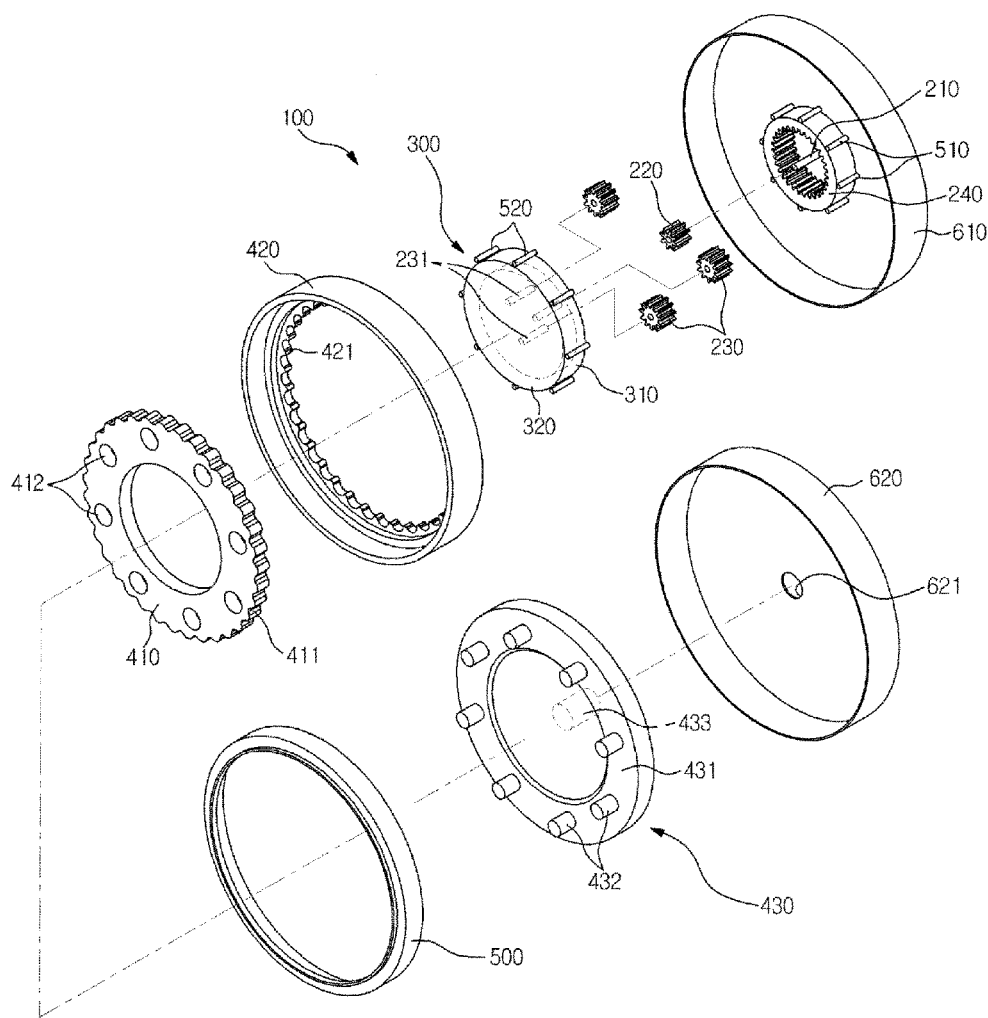
FIG. 2 is an exploded perspective view showing the structure of a decelerator according to an embodiment of the present invention.
Figure 3:
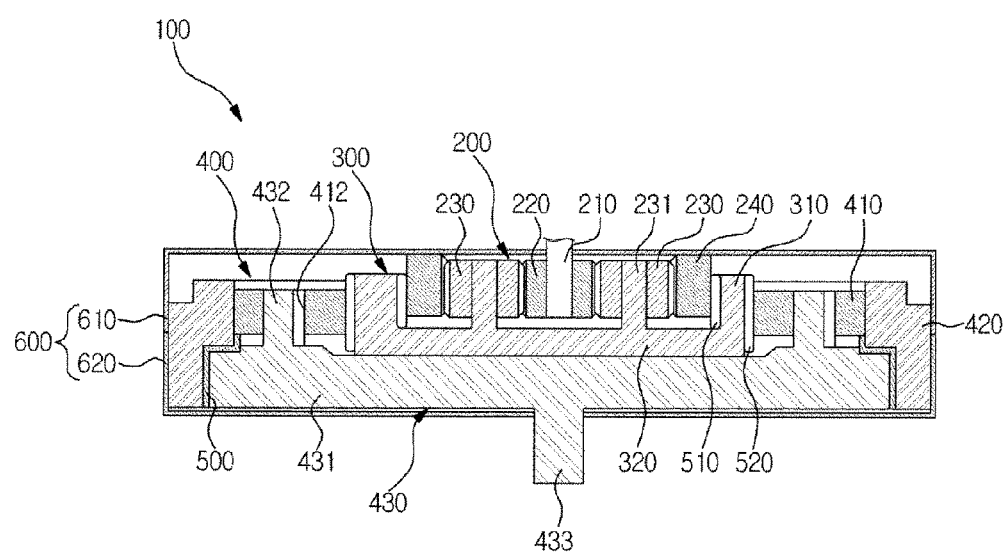
FIG. 3 is a side sectional view showing the structure of the decelerator according to the embodiment of the present invention.
Figure 4:
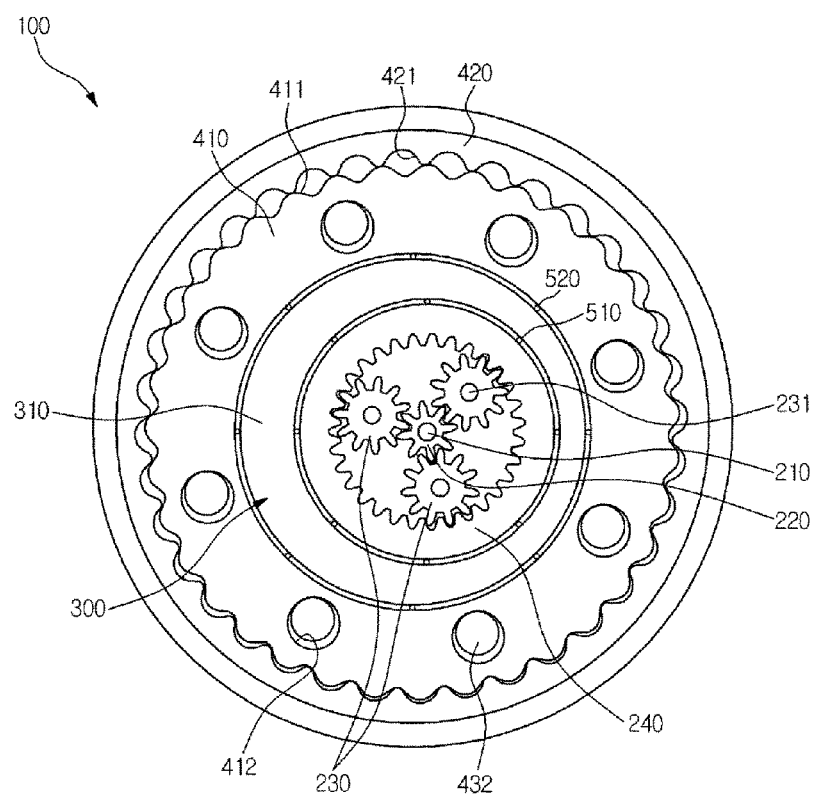
FIG. 4 is a plan view showing the structure of the decelerator according to the embodiment of the present invention.

As shown in FIGS. 2 to 4, the decelerator 100 includes a first deceleration unit 200 including an input shaft 210 rotated together with the shaft 51 of the motor 50, a sun gear 220 provided to rotate coaxially with the input shaft 210, a plurality of planet gears 230 provided around the sun gear 220 so as to revolve around the sun gear 220 while rotating on their axes during rotation of the sun gear 220, and a ring gear 240 fixed in a state in which the ring gear 240 is circumscribed about the planet gears 230 to guide revolution of the planet gears 230.

When the sun gear 220 is rotated by the rotation of the shaft 51 of the motor 50, the planet gears 230 disposed around the sun gear 220 revolve along the inner circumference of the ring gear 240 while rotating on their axes, and therefore, the rotation velocity of the motor 50 input through the input shaft 210 is primarily output through the planet gears 230, thereby achieving deceleration in one stage.

The decelerator 100 includes a carrier 300 mounted around the first deceleration unit 200 so as to be eccentrically rotated according to the revolution of the planet gears 230. The carrier 300 includes a ring 310 provided to surround the outer circumference of the ring gear 240 and a plate 320 to close one end of the ring 310. The carrier 300 is formed in the shape of a cup receiving the first deceleration unit 200 therein.

For eccentric rotation of the carrier 300, the ring 310 of the carrier 300 is configured so that the inner circumferential center of the ring 310 is eccentric with respect to the outer circumferential center of the ring 310, and shafts 231 of the planet gears 230 are integrally fixed around the center of the plate 320 of the carrier 300. Consequently, the carrier 300 is eccentrically rotated during the revolution of the planet gears 230 provided in the first deceleration unit 200.

Also, the decelerator 100 includes a second deceleration unit 400 including an inner gear 410 having cycloid teeth 411 formed at the outer circumference thereof and having the carrier 300 disposed in the inner circumference thereof so that the inner gear 410 is eccentrically rotated together with the carrier 300 and an outer gear 420 provided outside the inner gear 410 so that the outer gear 420 has teeth 421 corresponding to the cycloid teeth 411. The number of the teeth of the outer gear 420 may be slightly greater than that of the teeth of the inner gear 410, and the outer gear 420 may be fixedly mounted.

A first bearing 510 is mounted between the inner circumference of the ring 310 of the carrier 300 and the outer circumference of the ring gear 240, and a second bearing 520 is mounted between the outer circumference of the ring 310 of the carrier 300 and the inner circumference of the inner gear 410. The first bearing 510 prevents rotation interference of the carrier 300 due to the fixed ring gear 240, and the second bearding 520 enables the ring 310 of the carrier 300 to slippably contact the inner circumference of the inner gear 410. Also, the second deceleration unit 400 includes an output shaft 433 connected to the conversion unit 60 to rotate the conversion unit 60. The output shaft 433 is integrally provided at an output member 430 provided to be rotated by the inner gear 410.

That is, a plurality of through holes 412 is provided between the inner circumference and the outer circumference of the inner gear 410 in the circumferential direction. The output member 430 has a disc-shaped body 431 disposed opposite to the first deceleration unit 200. The body 431 is provided at one side facing the first deceleration unit 200 with a plurality of protrusions 432 arranged around the center in the circumferential direction so as to be inserted into the through holes 412. The output shaft 433 is provided at the center of the other side of the body 431 opposite to the first deceleration unit 200. The protrusions 432 and the output shaft 433 are integrally formed with the body 431. To allow eccentric rotation of the inner gear 410, each of the protrusions 432 has a less diameter than each of the through holes 412.

Consequently, the inner gear 410 is eccentrically rotated according to the eccentric rotation of the carrier 300 performed during the rotation of the planet gears 230 to revolve along the inner circumference of the outer gear 420 while rotating on their axes. The output member 430 connected to the inner gear 410 via the protrusions 432 is rotated according the revolution and rotation of the inner gear 410 to rotate the output shaft 433. At this time, the rotation velocity of the motor 50, primarily decelerated by the first deceleration unit 200, is further decelerated to increase driving force of the motor 50. A deceleration ratio of the second deceleration unit 400 may be set by adjusting the number of the cycloid teeth of the inner gear 410 and the number of the teeth of the outer gear 420. Unexplained reference numeral 500 indicates a washer disposed outside the body 431 of the output member 430. The washer 500 is provided to prevent operation interference among the output member 430, the inner gear 410, and the outer gear 420.

Also, the decelerator 100 includes a housing 600 provided to surround the first and second deceleration units 200 and 400. The housing 600 includes a first housing 610 provided to cover the circumference of the input shaft 210 and a second housing 620 provided to cover the circumference of the output shaft 433. The first and second housings 610 and 620 are coupled to form a cylindrical shape. The input shaft 210 is rotatably mounted in the first housing 410. The second housing 620 has a through hole 621, through which the output shaft 433 extends. The ring gear 240 of the first deceleration unit 200 is fixed to the inside of the first housing 610 around the input shaft 210. The outer gear 420 may be fixed to the inside of the housing 600.

In the decelerator 100 with the above-stated construction, the planet gear type first deceleration unit 200 is located inside the cycloid type second deceleration unit 400, and the carrier 300 disposed therebetween receives output from the first deceleration unit 200 to provide eccentric rotational force to the second deceleration unit 400.

In the decelerator 100 according to the embodiment of the present invention, the increase in axial thickness of the motor 50 is restrained, and the rotation velocity of the motor is decelerated in multi stages by the first deceleration unit 200, the second deceleration unit 400, and the carrier 300, thereby effectively increasing a deceleration ratio.

In the motor brake with the decelerator 100, the deceleration ratio of the motor 50 is increased by the decelerator 100, and the increase in total length of the motor brake is restrained by the decelerator 100, thereby improving space utilization.

In this embodiment, the decelerator 100 is adopted only to decelerate the motor 50 of the motor brake. Alternatively, the decelerator 100, configured so that the first deceleration unit 200 is located inside the second deceleration unit 400, and the carrier 300 disposed therebetween receives output from the first deceleration unit 200 to provide eccentric rotational force to the second deceleration unit 400, may be easily applied to various motor adopting devices that increase a deceleration ratio while not increasing the axial thickness of the motor in addition to the motor brake.

As is apparent from the above description, the decelerator according to the embodiment of the present invention is configured so that the planet gear type first deceleration unit is provided inside the cycloid type second deceleration unit to provide eccentric rotational force to the second deceleration unit.

In the decelerator according to the embodiment of the present invention, therefore, the increase in axial thickness of the motor is restrained, and the deceleration ratio is effectively increased.

In the motor brake with the decelerator, the deceleration ratio of the motor is increased, and the increase in total length of the motor brake is restrained by the decelerator, thereby improving space utilization.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A decelerator comprising:
a first deceleration unit comprising a sun gear provided to rotate coaxially with an input shaft, a plurality of planet gears provided around the sun gear to revolve around the sun gear while rotating on their axes during rotation of the sun gear, and a ring gear fixed in a state in which the ring gear is circumscribed about the planet gears to guide revolution of the planet gears;
a carrier mounted around the first deceleration unit to be eccentrically rotated according to the revolution of the planet gears; and
a second deceleration unit comprising an inner gear disposed around the carrier to be eccentrically rotated together with the carrier, the inner gear having cycloid teeth formed at an outer circumference of the inner gear and a plurality of through holes provided between an inner circumference and the outer circumference of the inner gear in a circumferential direction, an outer gear provided outside the inner gear so that the outer gear is provided with teeth corresponding to the cycloid teeth at an inner circumference of the outer gear, and an output member provided with a plurality of protrusions arranged in a circumferential direction along an edge of the output member at one side to be inserted into the through holes, each of the protrusions having a smaller diameter than each of the through holes, and provided with an output shaft at a center of the output member at another side,
wherein the carrier comprises a ring provided to surround an outer circumference of the ring gear and a plate to close one end of the ring, the carrier having a cup shape to receive the first deceleration unit therein, the ring has an inner circumferential center being eccentric with respect to an outer circumferential center of the ring, and the planet gears have shafts which are fixed to the plate.

2. The decelerator according to claim 1, further comprising a bearing provided between an outer circumference of the ring and the inner circumference of the inner gear so that the carrier slips with respect to the inner circumference of the inner gear.

3. A motor brake comprising a disc rotated together with a wheel of a vehicle, a frictional pad to press the disc, a piston to push the frictional pad to the disc, a motor to generate rotational force in alternating directions, a conversion unit to convert rotation of the motor into linear reciprocation and to transmit the linear reciprocation to the piston, and a decelerator provided between the motor and the conversion unit to decelerate the motor, wherein the decelerator comprises:

a first deceleration unit comprising a sun gear provided to rotate coaxially with an input shaft rotated together with a shaft of the motor, a plurality of planet gears provided around the sun gear to revolve around the sun gear while rotating on their axes during rotation of the sun gear, and a ring gear fixed in a state in which the ring gear is circumscribed about the planet gears to guide revolution of the planet gears;

a carrier mounted around the first deceleration unit to be eccentrically rotated according to the revolution of the planet gears; and a second deceleration unit comprising an inner gear disposed around the carrier to be eccentrically rotated together with the carrier, the inner gear having cycloid teeth formed at an outer circumference of the inner gear and a plurality of through holes provided between an inner circumference and the outer circumference of the inner gear in a circumferential direction, an outer gear provided outside the inner gear so that the outer gear is provided with teeth corresponding to the cycloid teeth at an inner circumference of the outer gear, and an output member provided with a plurality of protrusions arranged in a circumferential direction along an edge of the output member at one side to be inserted into the through holes, each of the protrusions having a smaller diameter than each of the through holes, and provided with an output shaft at a center of the output member at another side, wherein the carrier comprises a ring provided to surround an outer circumference of the ring gear and a plate to close one end of the ring, the carrier having a cup shape to receive the first deceleration unit therein, the ring has an inner circumferential center being eccentric with respect to an outer circumferential center of the ring, and the planet gears have shafts which are fixed to the plate.

* * * * *